Sept. 10, 1935. H. J. BOIARDI 2,013,906
COOKER
Filed Nov. 19, 1932 4 Sheets-Sheet 1

INVENTOR
HECTOR J. BOIARDI
Kwis Hudson & Kent
ATTORNEYS

Sept. 10, 1935.  H. J. BOIARDI  2,013,906
COOKER
Filed Nov. 19, 1932    4 Sheets-Sheet 3

INVENTOR:
HECTOR J. BOIARDI
Kwis Hudson & Kent
ATTORNEYS

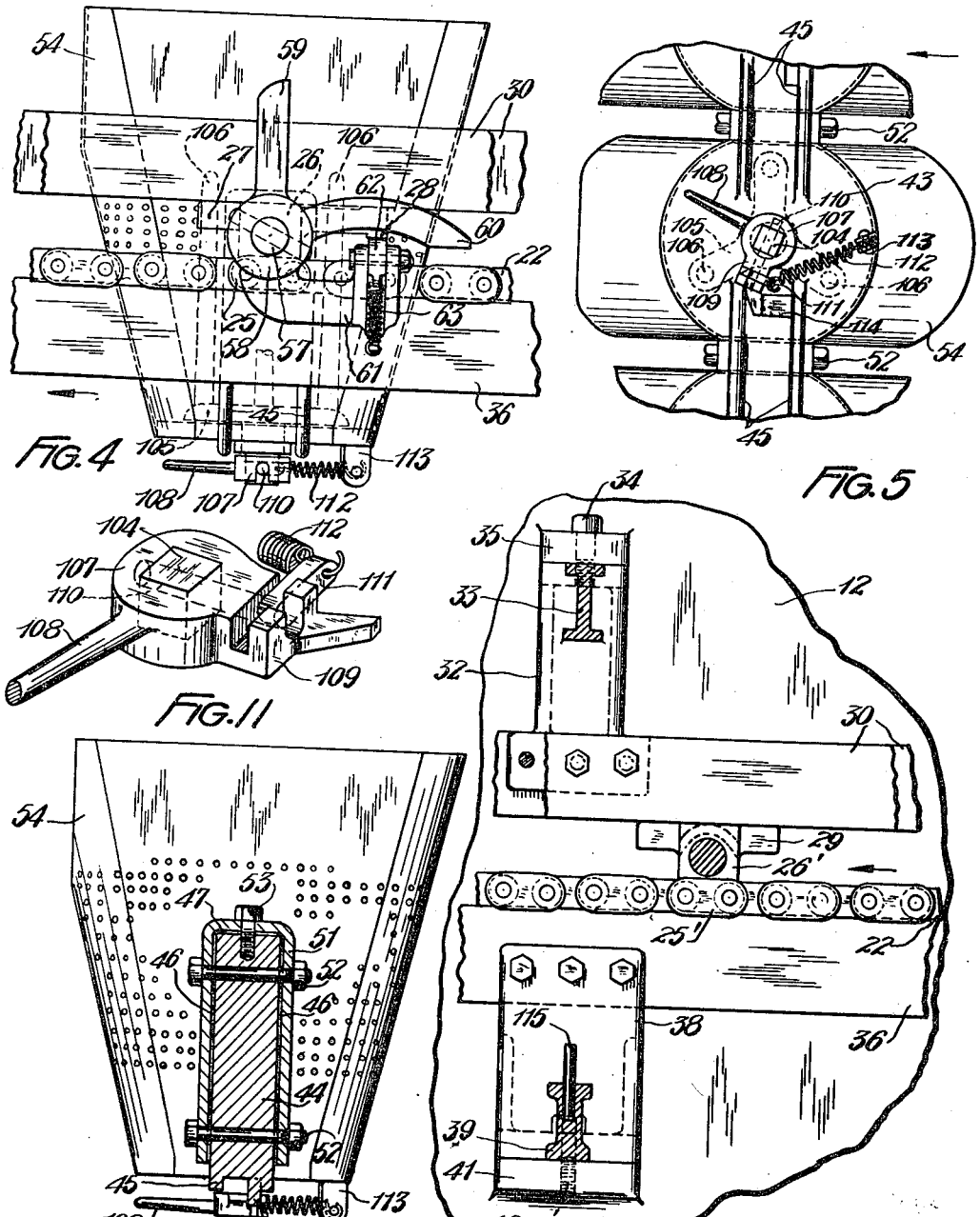

Patented Sept. 10, 1935

2,013,906

UNITED STATES PATENT OFFICE 2,013,906

COOKER

Hector J. Boiardi, Cleveland, Ohio, assignor to The Chef Boiardi Food Products Company, Cleveland, Ohio, a corporation of Ohio Application November 19, 1932, Serial No. 643,481

12 Claims. (Cl. 99—2)

This invention relates to cookers, more specifically to apparatus for cooking in separate containers and by continuous process, small or individual portions of a given food, as for example spaghetti, although it is to be understood that various other kinds of food which are boiled or heated in water or other liquid may be prepared in my apparatus.

One of the objects of the invention is the provision of an apparatus or machine of this character which shall require a minimum of labor for a maximum of output, and wherein the labor employed may be relatively unskilled.

Another object is the provision of a machine or apparatus which shall have an unusually large capacity, more or less of which can remain unutilized except at rush times when the maximum capacity is required.

Another object is the provision of a cooking apparatus comprising means for stirring or agitating the food while it is being cooked, and for holding the containers against undesired motion during the agitating operation.

Another object is the provision of means for causing the containers or buckets to travel upwardly out of the cooking tank or boiler after the cooking operation is completed, and to be then dumped by suitable means, as for instance by being turned or tilted upon a horizontal axis.

A further object is the provision of apparatus of this character so constructed and arranged that all parts which come into contact with the food or the cooking liquid may be readily disassembled for cleaning.

Other objects and features of novelty will appear as I proceed with the description of that embodiment of the invention which, for the purposes of the present application, I have illustrated in the accompanying drawings, in which Figure 1 is a side elevational view of an apparatus or machine embodying the invention.

Fig. 4 is a fragmental detail elevational view of one of the buckets together with a portion of the conveyor and of the upper tracks therefor, this view being taken substantially on the line 4—4 of Fig. 2.

Fig. 5 is a bottom plan view of one of the buckets and its supporting hanger.

Fig. 6 is a vertical sectional view taken substantially on the line 6—6 of Fig. 2.

Fig. 7 is a fragmental elevational view of a portion of the upper run of the conveyor with its cooperating tracks, this view being partly in section upon the line 7—7 of Fig. 2.

Fig. 11 is a bottom perspective view of the operating means for the agitator.

Similar reference characters refer to like parts throughout the views.

Figure 1:
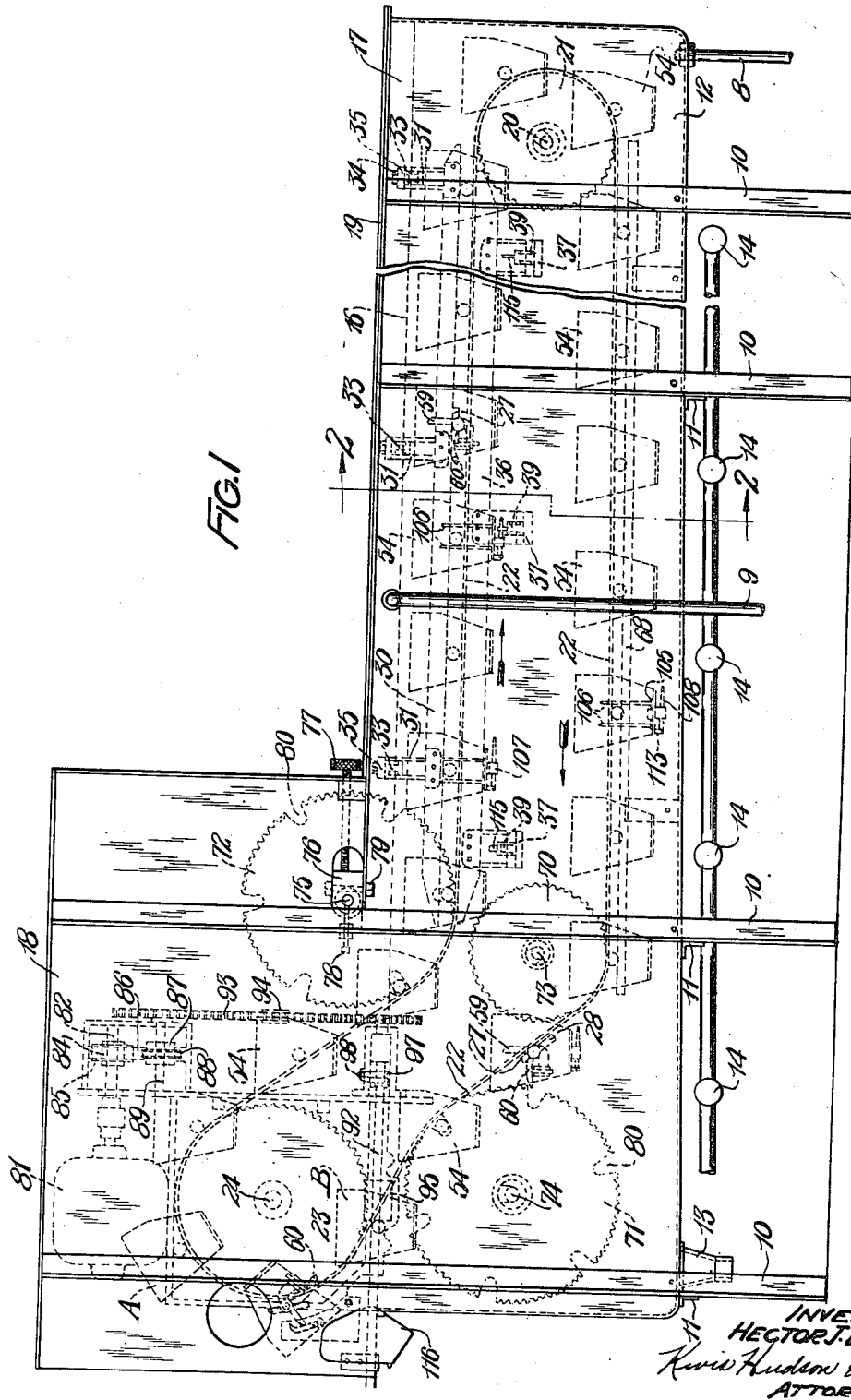

In the embodiment illustrated I employ a framework of angle irons comprising uprights 10, transverse braces 11 and any other necessary elements. Within this framework is supported a sheet metal tank 12 having a gradually sloping bottom leading to a drain connection 13. Any suitable means may be provided for heating the contents of the tank, that illustrated in the present instance being one or more gas burners located beneath the tank, as shown at 14. A water connection for filling the tank is shown at 8, and an overflow drain connection at 9. If desired, the side walls of the tank may be enclosed in asbestos or other heat insulating material 15. When in use the tank is filled with water or other cooking liquid up to a level indicated at 16, which may be permitted to vary to some extent, although I prefer to maintain it more or less exact by suitable automatic means, such as a float controlled valve, or to feed fresh water into the tank at a slow rate constantly through water connection 8 while the apparatus is in use, the desired water level being maintained by means of the overflow discharge connection 9. By the latter method any scum which may be released in the cooking operation is carried off, and the liquid is maintained clear throughout the operation of the machine. It will be appreciated that the absorption of liquid by the food in cooking results in the removal of a substantial amount of liquid which, in any event, would have to be replaced.

The apparatus comprising an elongated portion 17 of the tank, where the cooking is mainly performed, and a loading and unloading portion 18 where the walls of the tank are extended upwardly to a height considerably above that of the portion 17, the driving mechanism being supported by this end portion 18. The part 17 of the tank may be provided with a cover 19 which is readily removable so that the cooking compartment may be accessible at all times.

The food to be cooked is deposited in measured quantities in a series of containers or buckets, and these buckets are carried by an endless conveyor in two superposed paths through the elongated portion 17 of the tank or boiler. The length of the course taken by the buckets in their travel through the tank, and the speed of travel, are so selected as to provide the requisite cooking time.

Near the right hand end of the tank, as viewed in Fig. 1, I mount on the inner side walls bearings open at the top for the reception removably of a shaft 20, which carries near its extremities, and therefore adjacent the walls of the tank, a pair of sprocket wheels 21 over which run two endless flexible elements 22 which, in the present instance, are chains. At the opposite end of the machine these chains run over sprockets 23 which are keyed to a shaft 24 that is driven at a slow rate of speed by mechanism which will be described hereinafter.

Figure 2:
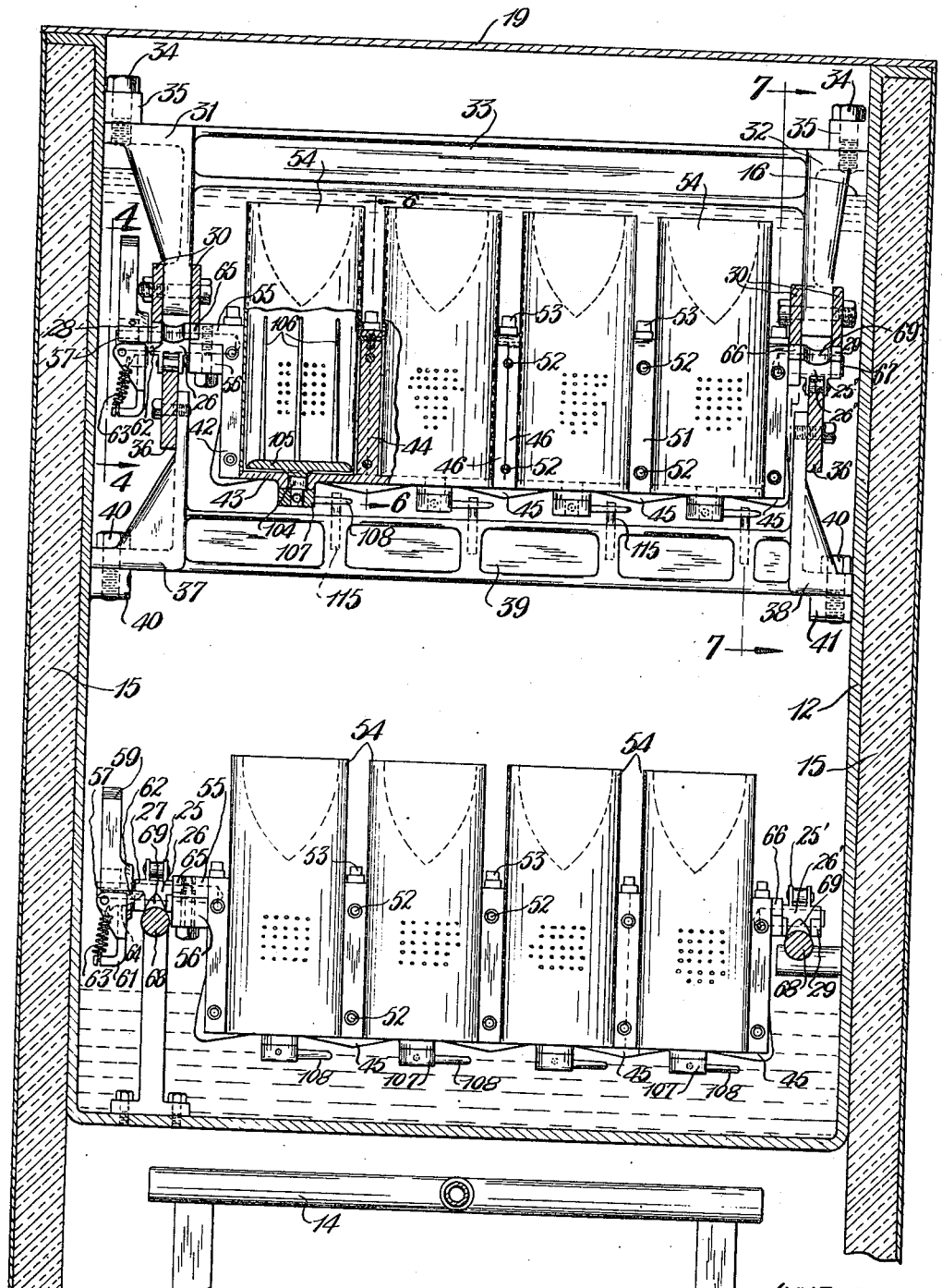
Fig. 2 is a cross sectional view on a larger scale, this view being taken substantially on the line 2—2 of Fig. 1.
Figure 3:
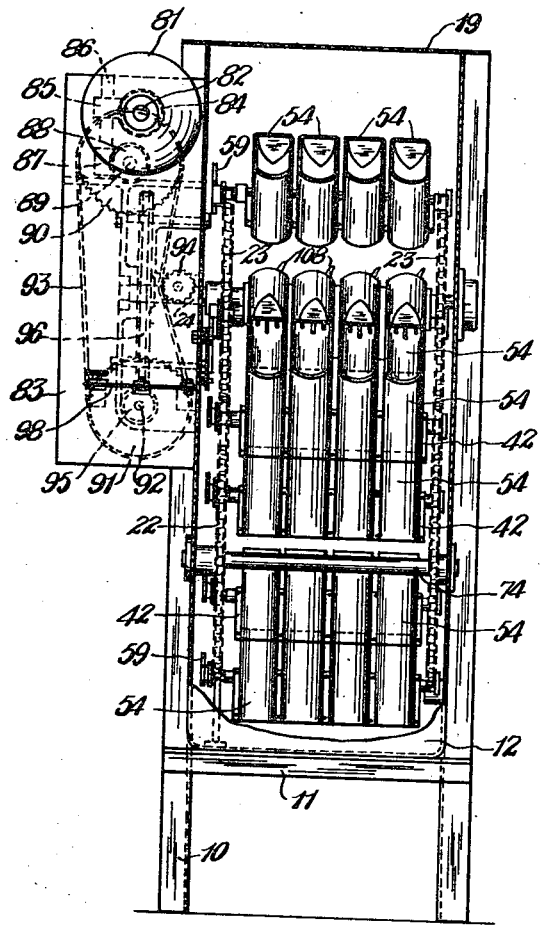
Fig. 3 is an end elevation, partly in section, showing that end of the conveyor which rises out of the water or other cooking liquid.

At intervals throughout the lengths of the chains 22 I insert special links 25 and 25' that carry outwardly extending blocks 26 and 26', the parts 25 and 26 being built into the chain shown at the left in Figs. 2 and 3, and the parts 25' and 26' being built into the chain shown at the right of those figures.

Formed integral with the outer side of each of the blocks 26 there is a track shoe 27 which has a rearward extension 28. The block 26' includes preferably as an integral part and on its outer side, a track shoe 29.

A pair of spaced track rails 30 are supported on each inner wall of the tank at intervals by brackets 31 and 32 connected by braces 33 and attached by screws or the like 34 to perforated lugs 35 mounted upon the side walls 12 of the tank. Other rails 36 are mounted below the rails 30, and are likewise supported upon brackets 37 and 38 connected by braces 39, these brackets also being secured by screws 40 to lugs 41 extending inwardly from the tank walls. The chains 22 run upon the rails 36, by which they are supported against sagging.

At intervals throughout the length of the conveyor blocks 26 and 26', located opposite each other, are connected by hangers 42, which are castings made in the form of a U or in the form of a series of U's placed edge to edge, depending upon whether the hanger is designed to support one or a plurality of buckets. In the present instance each hanger comprises four U portions although in practice they are cast together as a single integral element. The lower part 43 of each U is extended laterally to the form of a circle with flat sides, as indicated in Fig. 5, and in the embodiment illustrated constitutes the base of the bucket. One of the upright arms of the hanger is shown in section in Fig. 2 and is numbered 44. 45 are parallel reenforcing webs cast onto the bottom members of the hanger.

Figure 10:
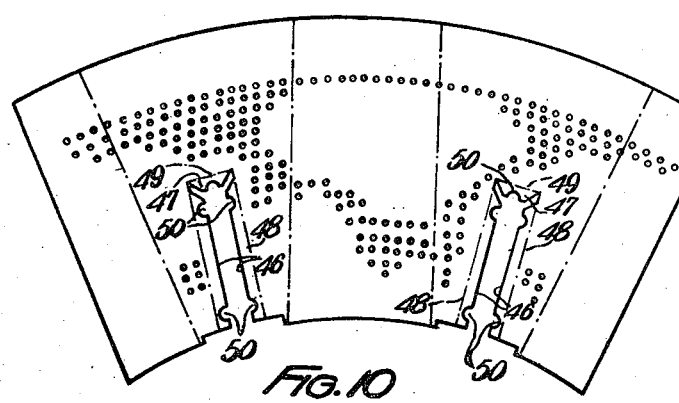
Fig. 10 is a plan view of a bucket blank.
Figure 9:
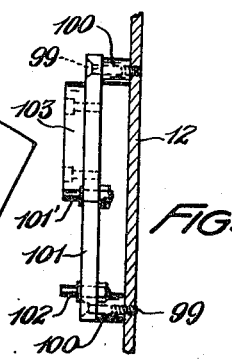
Fig. 9 is a detail sectional view taken substantially on the line 9—9 of Fig. 8.

The buckets may be made as castings, but I prefer to form them of sheet metal. A blank for the side walls of such a bucket is illustrated in Fig. 10. It may have a sheet metal bottom, but I prefer to let the flat disc-like portion 43 of the hanger serve as bottoms for the buckets. As shown in Fig. 10, slots are stamped out of two opposite sides of the blank to leave flanges 46 and 47, which are adapted to be bent outward along the lines 48 and 49 to stand at right angles to the sides. These flanges 46 and 47 embrace the uprights 44 of the hanger, and those of one bucket meet those of an adjacent bucket edge to edge, as shown at the middle in the upper portion of Fig. 2. The flanges have semi-circular notches 50 formed in their edges. When the buckets are in place on the hanger, a clamp or clip 51 of inverted U form is slipped down over the upright 44 and the adjacent flanges 46 and 47, and thereafter bolts 52 are passed through openings in the clamp, through the openings formed by the registering notches 50 and through aligned openings in the upright 44. A screw 53 is also inserted through an opening in the top of the clamp and through registering notches 50 in the flanges 47 into a threaded opening in the top of the upright 44. The buckets are thereby rigidly, although removably, mounted upon the hangers.

The numeral 54 is used herein as a general reference character applying to the buckets. The dot and dash lines in Fig. 10 indicate the lines of the bends in the bucket, it being understood that two sides are flat and two sides curved. The side walls are perforated to permit the circulation of water or other cooking liquid through the bucket. The number, size, and location of the perforations may of course be varied to suit conditions. Covers for the buckets may be provided if desired, although I do not regard them as necessary for foods such as spaghetti.

The outer upright at the left of each hanger, as viewed in Fig. 2, has a lateral extension 55 to which is attached a casting 56. A shaft 57 is mounted in an opening formed in the two members 55 and 56 and in the upright, being locked against rotation therewith, and this shaft extends loosely through a bearing formed in the block 26 of the chain. A collar 58 is pinned to the shaft outside the block 26. This collar carries two fingers 59 and 60 and a bracket 61. In the bracket 61 there is pivoted a latch 62 which is adapted to engage the extension 28 on the track shoe 27. This latch is beveled on one side in order that it may ride over the extension 28 in one direction, and is normally held by a coil spring 63 against a stop 64 on the bracket.

On the extension 55 there is a track shoe 65 parallel with the shoe 27. These two shoes are adapted to run upon the lower surfaces of the rails 30. The shoe 65, being rigidly attached to the hanger 42, acts to prevent oscillation of the hanger, while the shoe 27, through the intermediacy of the extension 28 and the latch 62 acts also for a similar purpose.

On the opposite end of the hanger there is another track shoe 66 which is rigid with the adjacent upright of the hanger and which is identical in form with the shoes 29 and 65. On this end of the hanger a shaft 67 extends through the block 26' and into the hanger, and constitutes the means by which the hanger is supported from the chain 22 on that side of the machine.

For cooperation with the return run of the conveyor I mount lower down in the tank a pair of round rails 68 which cooperate with grooves 69 in the blocks 26 and 26' for guiding and supporting the chains on this run.

In order to guide the conveyor upwardly out of the liquid at the charging and discharging end of the machine, and then back again into the liquid, I employ three pairs of sprocket wheels 70, 71 and 72. The wheels 70 are mounted upon a shaft 73 which is removably supported in open top bearings in the tank. The wheels 71 are likewise mounted upon a shaft 74 which is also removably supported in open top bearings carried by the walls of the tank. The wheels 72 are mounted upon a shaft 75 which is rotatably supported in end blocks 76 that are adjustable longitudinally of the machine by means of adjusting screws 77 and 78. The shaft 75 is held against longitudinal movement in the blocks 76 by removable bolts 79 carried by the blocks, these bolts extending through grooves formed in the shaft. The shaft 75 and its sprocket wheel 72 may therefore be removed for cleaning without disturbing the adjustment of the journal blocks 76. Each of the sprockets 71 and 72 is provided with a series of radial slots 80 within which are accommodated the blocks 26 and 26' on the chains.

The shaft 24 may be driven from a suitable power source through a reduction gearing of such character as to provide travel of the conveyor through a complete cycle in a length of time of the order of five to fifteen minutes. As herein disclosed, I employ an electric motor 81, the shaft 82 of which extends into a gear housing 83. Within the latter the shaft 82 carries a worm 84 which drives a worm wheel 85 on a vertical shaft 86, the latter carrying also a worm 87 which meshes with a worm wheel 88 on a horizontal shaft 89. On the latter shaft there is mounted a sprocket wheel 90 which is in the same vertical plane with another sprocket wheel 91 that is mounted upon another shaft 92 lower down. These two sprocket wheels are connected by means of a chain 93, and an adjustable idler sprocket 94 is employed to take up whatever slack there may be in the chain. It may at times be desirable to substitute for one or the other of the sprockets 90 and 91 other sprockets of different size in order to vary the speed of travel of the conveyor, and when this is done the idler sprocket 94 is moved inwardly or outwardly to compensate for the difference in the effective length of the chain. On the shaft 92 there is a worm 95 which drives a large worm wheel 96 that is fast on shaft 24.

In order to start and stop the mechanism independently of the motor I may employ a clutch 97 of any desired character between the sprocket 91 and the shaft 92, and this clutch may be controlled by hand lever 98 or the like.

On one of the inner side walls 12 at the charging and discharging end of the machine I mount, by means of screws 99 and spacers 100, a metal plate 101. This plate is employed as a mounting for stops used in the dumping of the buckets. At the lower end of the plate I secure a stud 102 which is adapted to engage the finger 60 of each hanger as it passes the stud, and to thereby cause the tilting of the hanger and its buckets to the dumping position. The plate 101 also has secured to its outer surface a cam bar 103 for engagement with the finger 59, which serves to hold the corresponding buckets in dumping position for a period during their upward travel, the upper end of the bar 103 having a rather sharp curve by means of which a final tilt is imparted to the buckets more or less suddenly.

Stirring or agitation of the food in the buckets is necessary or desirable in some instances. In the case of spaghetti this is true, and it is also true that a rather vigorous agitation is beneficial in that case, particularly during the early part of the cooking operation while the mass is expanding because of the water being absorbed. In the embodiment of the invention herein illustrated I have provided for such agitation by the following means:

Each disc-like portion 43 of the hangers 42 is formed with a central opening in which is journaled a shaft 104, upon the upper end of which within the bucket there is a spider 105 which carries one or more upstanding stirring or agitating bars 106, see Figs. 2 and 5. The lower end of shaft 104 is surrounded by a collar 107 that carries an operating lever 108. The collar 107 is also provided with a radial extension 109, through which extends a radial opening that is adapted to register with an opening through the shaft 104. In order to lock the collar 107 to the shaft removably, I insert a pin 110 through these registering openings. At its outer extremity this pin has an angular portion 111 which is adapted to rest within a notch in the extension 109 when the pin is rotated to the proper angle. A coil spring 112, attached to this angular portion 111 and to a depending lug 113 on the hanger, serves to hold the pin at the angle stated. It also serves to hold the extension 109 on the collar up against a stop 114 formed integral with one of the reenforcing webs 45.

In each of the transverse braces 39 I mount a set of upstanding pins 115 which are located in the paths of the levers 108, so that when the buckets travel past a given brace 39 each of the levers 108 is swung from a position, approximately that indicated in Fig. 5, to another position at an angle of about 135° therefrom, thereby storing up energy in the spring 112. As soon as the levers 108 pass these stop pins 115, the springs 112 return the shafts 104 with their agitators to the position indicated in Fig. 5. That portion of the stirring action contributed by the contraction of the spring is rather vigorous.

At the charging and discharging end of the machine I may employ a delivery chute or a plurality of delivery chutes 116 corresponding in number to the number of buckets in a hanger. These chutes are so positioned as to receive the contents of the buckets when they are dumped, and by this means the cooked food may be directed into suitable dishes or containers.

*Operation.*—Assuming that the tank has been filled to the proper level with water or other cooking liquid, and that the latter has been brought to the desired temperature for cooking, the mechanism may then be put into operation by starting the electric motor 81 and throwing into engagement the clutch 97. As each bank or group of empty buckets comes into the position indicated substantially at A in Fig. 1 the operator deposits therein a measured quantity of the food to be cooked. The four buckets of each group may be filled, or, when the demand is not at the maximum, a lesser number, such as one, two or three buckets in each group may be filled, or if preferred all the buckets of certain groups may be filled while all those of another group may be left empty.

The loaded buckets travel with the conveyor over the top of sprocket wheels 23 and downwardly toward the right, as viewed in Fig. 1. At this time they are held in vertical position by gravity alone. The conveyor is carried down below the water level by the sprocket wheels 72 until the track shoes 27, 29, 65 and 66 of a given group of buckets slide over the forward ends of the track rails 30. From that time on during the travel of the buckets in engagement with the rails 30 the buckets are held against oscillation, which is essential in order that the agitators may be actuated. Otherwise the hangers would merely tilt sufficiently to enable the levers 108 to ride over the tops of stop pins 115.

When the group of buckets leaves the rails 30 at the rear of the machine, the buckets remain vertical by the action of gravity during their movement in the semi-circular path around the sprocket wheels 21. The track shoes 27 with their extensions 28 turn however with the chains to which they are secured. The extensions 28 therefore leave the latches 62 as the buckets make the turn, and the shoes 27 when they come into position for the return travel along the lower path are inverted, and the extension 28 is still in the rear, while the latch 62 leads instead of follows the central plane of the hanger.

Throughout the return travel along the tracks 68 the buckets are held in vertical position by gravity alone, the tracks serving merely to support the weight of the conveyor and its load.

Figure 8:
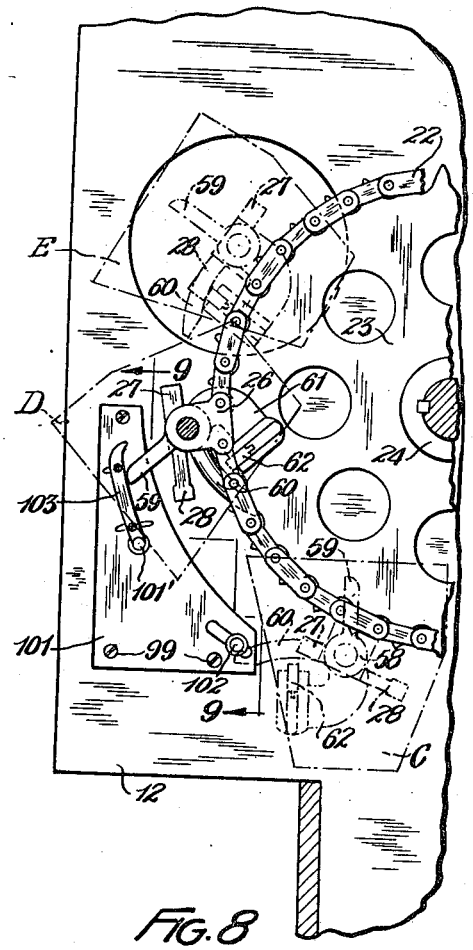
Fig. 8 is a side view of the elevated end of the conveyor showing different positions of a bucket as it is being dumped and as it is being held in inclined position for reloading.

By the time a given set of buckets has reached the position indicated by B in Fig. 1 they are partly above the water level and the water in them is gradually draining out. When they get to the position indicated at C in Fig. 8 we can assume that all of the water is drained out. At this point the finger 60 engages stud 102, and as the collar 58 with which the finger 60 is integral is pinned to shaft 57, and that shaft is rigid with the hanger, the latter is turned or tilted in the chain blocks 26 and 26'. The track shoe 27 does not tilt with the buckets, being fixed to the chain block 26. Hence as the hanger tilts in the chains from the position C toward the position D of Fig. 8, the latch 62 travels past the projection 28 over which it is cammed by its bevel face. Just before the finger 60 leaves the stud 102, the finger 59 comes into position to engage the cam bar 103, and the buckets are thereby held in dumping position for a further period. Before leaving the cam bar 103 they are given a sudden further tilt and then released, when gravity tends to swing them back to vertical position. This sudden movement serves to dislodge any material which might otherwise adhere occasionally to the walls of the buckets. When the finger 59 passes beyond the cam bar 103 the buckets do not however assume a vertical position, because the latch 62 swings up against the extension 28 on the track shoe 27, and the buckets are thereby held in inclined position, as indicated at E in Fig. 8. The engagement between the latch 62 and the extension 28 continues throughout the rest of the upward movement of the buckets, and they therefore stand in substantially radially positions until they reach the highest point in the travel of the conveyor. On the descent the shoe 27 moves away from the latch 62, and the buckets therefore are free to hang vertical again.

The machine may be operated continuously for long periods, and without attention except for the placing and removal of containers for receiving the cooked food as it is unloaded through the chutes 116, and except for the reloading of the empty buckets. At the end of a day's run that part of the machine within the tank may be completely disassembled, the bearings for the various shafts permitting the removal of shafts 20, 73 and 74 upwardly and the removal of shaft 75 lengthwise, as previously described. The tracks and braces for the upper run of the conveyor are also readily removable by the removal of screws 34 and 40. The disassembly of these parts may be performed in a comparatively short time and all of the parts thoroughly cleaned and reassembled.

In the foregoing description I have necessarily gone somewhat into detail in order to explain fully the particular embodiments of the invention herein illustrated, but I desire it to be understood that such detail disclosures are not to be construed as amounting to limitations, except as they may be included in the appended claims.

Having thus described my invention, I claim:

1. In a cooker, a tank adapted to hold liquid, means for heating the liquid in the tank, a conveyor having a path of movement into said tank, through said tank and out of said tank, a series of buckets associated with said conveyor for movement therewith into, through and out of said tank, said buckets having foraminous portions adapted to permit the circulation of liquid therethrough, means for driving said conveyor, and means for dumping said buckets as they travel with the conveyor after rising above the liquid level in the tank, said dumping means for each bucket comprising a fixed cam bar and a finger rigid with the bucket, said cam bar having a hook portion adapted to impart a sudden jerk to the buckets while in inverted position at the conclusion of the dumping operation whereby any material which may tend to adhere to the buckets is dislodged.

2. In a cooker, an elongated tank adapted to hold liquid, means for heating the liquid in the tank, an endless conveyor comprising two runs vertically spaced within the tank, means for driving said conveyor, a series of buckets associated with said conveyor for movement therewith, said buckets having foraminous portions adapted to permit circulation of the liquid therethrough, one end of said conveyor being so located and arranged as to lift said buckets above the liquid level of the tank, and the other end of the conveyor being so located and arranged as to cause the buckets associated therewith in both runs to travel beneath the liquid level of the tank, and means actuated by the travel of the conveyor for dumping said buckets during their rise at the elevated end of the conveyor.

3. In a cooker, an elongated tank adapted to hold liquid, means for heating the liquid in the tank, an endless conveyor comprising two runs vertically spaced, a series of buckets associated with said conveyor for movement therewith, said buckets having foraminous portions adapted to permit circulation of the liquid therethrough, the major portion of said runs extending in substantially parallel paths through said tank at heights such that said buckets travel beneath the liquid level of the tank, the two runs of the conveyor at one end of the apparatus having upwardly extending portions such that the buckets associated therewith rise above the liquid level, means for driving said conveyor, and means actuated by the travel of the conveyor for dumping said buckets as they rise above the liquid level at the elevated end of the conveyor.

4. In a cooker, a tank adapted to hold liquid, means for heating the liquid in the tank, a conveyor having a path of movement into said tank, through said tank and out of said tank, a series of buckets associated with said conveyor for movement therewith into, through and out of said tank, said buckets having foraminous portions adapted to permit the circulation of liquid therethrough, an agitator mounted in each bucket, a spring attached to each agitator, means put into motion by the travel of the conveyor for moving each agitator in a direction to tension its spring and then releasing the agitators during the travel of the buckets through the tank, and means for driving said conveyor.

5. In a cooker, a tank adapted to hold liquid, means for heating the liquid in the tank, a conveyor having a path of movement into said tank, through said tank and out of said tank, a series of buckets associated with said conveyor for movement therewith into, through and out of said tank, said buckets having foraminous portions adapted to permit the circulation of liquid therethrough, an agitator mounted in each bucket, each of said agitators carrying an operating lever, means mounted in the tank for engagement with each of said levers, whereby each lever is operated to actuate its agitator, and means for driving said conveyor.

6. In a cooker, a tank adapted to hold liquid, means for heating the liquid in the tank, a conveyor having a path of movement into said tank, through said tank and out of said tank, a series of buckets associated with said conveyor for movement therewith into, through and out of said tank, said buckets having foraminous portions adapted to permit the circulation of liquid therethrough, an agitator mounted in each bucket, each of said agitators carrying an operating lever and a spring tending to hold said lever in a given position, and a stop mounted in the tank in position to be engaged by said lever, whereby the lever is turned upon its axis against the action of said spring until the stop is cleared, whereupon the spring acts to impart rapid motion to the lever in a reverse direction, and means for driving the conveyor at a relatively slow rate of speed.

7. In a cooker, a tank adapted to hold liquid, means for heating the liquid in the tank, a conveyor having a path of movement into said tank, through said tank and out of said tank, a series of buckets associated with said conveyor for movement therewith into, through and out of said tank, said buckets having foraminous portions adapted to permit the circulation of liquid therethrough, means for driving said conveyor at a relatively slow rate of speed, and means set in operation by the conveyor travel for building up energy tending to oscillate said agitators and for suddenly releasing said energy, whereby sudden vigorous agitation is imparted to the contents of the buckets.

8. In a cooker, a tank adapted to hold liquid, means for heating the liquid in the tank, a conveyor having a path of movement into said tank, through said tank and out of said tank, a series of buckets associated with said conveyor for movement therewith into, through and out of said tank, said buckets having foraminous portions adapted to permit the circulation of liquid therethrough, each of said buckets carrying an agitator mounted upon a vertical shaft extending through a bearing in the bottom of the bucket, an operating lever upon the lower exposed end of the shaft, and means mounted in the tank for engagement with each of said levers, whereby each lever is operated as it passes said means to turn its shaft and actuate its agitator, and means for driving said conveyor.

9. In a cooker, a conveyor adapted to travel through a tank containing cooking liquid, said conveyor comprising two endless flexible elements spaced apart horizontally, hangers connecting opposed portions of said elements but free to oscillate, buckets supported in said hangers, whereby gravity may act to maintain the buckets in vertical position, a track associated with a run of said conveyor, means on the hanger adapted to engage said track for preventing oscillation of the hanger and its bucket, an agitator mounted in each bucket, an operating lever for each agitator, and fixed means for engaging said lever, whereby the agitator is actuated during the travel of the conveyor without oscillating the bucket.

10. A bucket for a cooker, comprising a base and side walls, said base having an opening therethrough, a shaft extending through said opening, an agitator bar secured to the shaft within the bucket, an operating lever mounted on the shaft below said base, releasable means for locking said lever to the shaft, a stop on the base to limit the oscillation of the shaft in one direction, and spring means tending to hold the shaft against the stop.

11. A bucket for a cooker, comprising a base and side walls, said base having an opening therethrough, a shaft extending through said opening, an agitator bar secured to the shaft within the bucket, an operating lever mounted on the shaft below said base, releasable means for locking said lever to the shaft, a stop on the base to limit the oscillation of the shaft in one direction, and spring means secured to the base and to said locking means for holding the locking means in position and for holding the shaft against the stop.

12. In apparatus of the class described, a plurality of buckets, a hanger adapted to support the same, each of said buckets having outwardly extending vertical ribs, the ribs of adjacent buckets being juxtaposed, said hanger having an upstanding portion between adjacent buckets, and a removable clamp for holding said ribs in locked engagement with said upstanding portion.

HECTOR J. BOIARDI.